United States Patent
Wolf et al.

(10) Patent No.: US 10,322,519 B2
(45) Date of Patent: Jun. 18, 2019

(54) HAND-GUIDED POWER TOOL WITH A CONTROL DEVICE

(71) Applicant: Andreas Stihl AG & Co. KG, Waiblingen (DE)

(72) Inventors: Günter Wolf, Oppenweiler (DE); Jan Kurzenberger, Köngen (DE); Holger Vollmer, Hilzingen (DE); Marcel Förster, Schwaikheim (DE); Ulrich Kapinsky, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 176 days.

(21) Appl. No.: 15/376,865

(22) Filed: Dec. 13, 2016

(65) Prior Publication Data

US 2017/0165863 A1    Jun. 15, 2017

(30) Foreign Application Priority Data

Dec. 15, 2015    (DE) .................. 10 2015 016 485

(51) Int. Cl.
| | |
|---|---|
| *B27B 17/08* | (2006.01) |
| *F02M 35/04* | (2006.01) |
| *F02B 63/02* | (2006.01) |
| *B23D 57/02* | (2006.01) |
| *B27B 17/02* | (2006.01) |
| *F02M 35/024* | (2006.01) |

(Continued)

(52) U.S. Cl.
CPC ............ *B27B 17/08* (2013.01); *B23D 57/023* (2013.01); *B25F 5/029* (2013.01); *B27B 17/02* (2013.01); *F02B 63/02* (2013.01); *F02M 35/024* (2013.01); *F02M 37/0023* (2013.01); *F02M 37/0047* (2013.01)

(58) Field of Classification Search
CPC ....... B23D 57/023; B27B 17/08; B27B 17/02; B25F 5/029; F02M 35/024; F02M 37/0047; F02M 37/0023; F02B 63/02
USPC ................ 30/381–387; 123/179.5, 518, 519; 220/746, 4.14, 562
See application file for complete search history.

(56) References Cited

U.S. PATENT DOCUMENTS 7,806,107 B2 * 10/2010 Knaub ............... F02M 37/0017
                                                                    123/468
9,925,685 B2 *  3/2018 Kawamura ............. B27B 17/12
(Continued)

FOREIGN PATENT DOCUMENTS

DE    10 2009 011685        9/2010
DE    20 2011 050893       11/2012
(Continued)

*Primary Examiner* — Ghassem Alie
(74) *Attorney, Agent, or Firm* — Gudrun E. Huckett (57) ABSTRACT

A hand-guided power tool has a power tool housing and an internal combustion engine arranged in the power tool housing and configured to drive a tool member of the power tool. A fuel tank and at least one electric component are provided. A control device that is an electronic control unit is connected to the at least one electric component of the power tool and controls the at least one electric component. The power tool has a top face which, when parking the power tool in a usual parking position on a flat horizontal support surface, is facing upwardly. The electronic control unit is positioned laterally adjacent to the fuel tank device, when viewing the power tool in the usual parking position.

17 Claims, 9 Drawing Sheets

(51) Int. Cl.
*F02M 37/00* (2006.01)
*B25F 5/02* (2006.01)

(56) References Cited

U.S. PATENT DOCUMENTS

| | | | |
|---|---|---|---|
| 2010/0132679 A1* | 6/2010 | Kawamura | B27B 17/00 |
| | | | 123/635 |
| 2010/0224384 A1 | 9/2010 | Gwodz et al. | |
| 2011/0056451 A1 | 3/2011 | Geyer | |
| 2013/0276724 A1 | 10/2013 | Lank et al. | |
| 2013/0340722 A1* | 12/2013 | Osburg | F02M 37/0023 |
| | | | 123/510 |
| 2014/0175721 A1 | 6/2014 | Stieler | |
| 2015/0027745 A1 | 1/2015 | Kurzenberger et al. | |
| 2015/0047593 A1* | 2/2015 | Geyer | F02B 63/02 |
| | | | 123/179.5 |
| 2017/0259452 A1* | 9/2017 | Kachi | B25F 5/02 |

FOREIGN PATENT DOCUMENTS

| | | |
|---|---|---|
| EP | 2 653 695 | 10/2013 |
| EP | 2 829 363 | 1/2015 |
| EP | 2 848 800 | 3/2015 |

* cited by examiner

HAND-GUIDED POWER TOOL WITH A CONTROL DEVICE

BACKGROUND OF THE INVENTION

The invention relates to a hand-guided power tool comprising a power tool housing in which an internal combustion engine for driving a tool member of the power tool is arranged. The power tool comprises a fuel tank and a control device for controlling at least one electric component of the power tool, wherein the control device is an electronic control unit and wherein the control device is connected with at least one electric component of the power tool. The power tool has a top face that is facing upwardly when the power tool is positioned in the usual parking position on a flat horizontal support surface.

US 2013/0340722 A1 discloses a hand-guided power tool in the form of a cut-off machine. The cut-off machine is driven by an internal combustion engine. For supplying the internal combustion engine with fuel, a tank housing of the cut-off machine is embodied with a fuel tank. The fuel is supplied to the internal combustion engine by a fuel valve that is controlled by a control device. The control device is arranged above the fuel tank and also above an intake passage of the internal combustion engine.

It is the object of the invention to provide a hand-guided power tool of the aforementioned kind that has an advantageous configuration.

SUMMARY OF THE INVENTION

In accordance with the invention, this is achieved in that the control device is arranged laterally adjacent to the fuel tank when viewing the power tool in the usual parking position.

It is provided that the control device, viewed in the usual parking position of the power tool, is arranged laterally adjacent to the fuel tank. By arranging the control device laterally adjacent to the fuel tank, the available installation space can be utilized well. The control device can be fixed relative to the fuel tank so that a simple connection of the control device results. The connecting lines that connect the control device with the electric components can be arranged in a beneficial way, in particular at least partially at the fuel tank or in the area of a tank housing of the power tool in which the fuel tank is arranged.

The control device is advantageously arranged such that a beneficial position of the center of gravity of the power tool results. This is possible in a simple way by arranging the control device laterally adjacent to the fuel tank. When the power tool is a motor chainsaw, the center of gravity of the control device is advantageously positioned near a longitudinal center plane of the motor chainsaw, particularly preferred close to a longitudinal center axis of a guide bar of the motor chainsaw. In this way, the motor chainsaw can be easily pivoted about the longitudinal center axis of the guide bar. By arranging the control device laterally adjacent to the fuel tank, which in case of motor chainsaws is usually positioned at the rear of the motor chainsaw facing away from the guide bar, the weight of the control device can advantageously compensate at least partially the weight of the guide bar secured on the motor chainsaw. In this way, a beneficial location of the center of gravity, in particular in the area below the grip pipe that is extending across the motor chainsaw, can be achieved, even for motor chainsaws with long guide bars.

Advantageously, the control device is arranged in a receptacle of the power tool housing that is open at least at one side. In order to provide for good accessibility, the control device is arranged in a receptacle of the power tool housing that, in the usual parking position of the power tool, is open at the top. The top side of the control device is therefore positioned outside of the receptacle and is accessible for the operator. An arrangement of the control device in a receptacle of the power tool housing that is open in lateral, forward, rearward and/or downward direction may however also be advantageous. By arranging the control device in a receptacle, the fixation of the control device on the power tool housing is simplified. At the same time, the control device is protected well against mechanical damage. A particularly advantageous configuration results when the control device in the receptacle is secured in the receptacle by at least one fastening screw that is screwed in from the downwardly facing bottom side of the power tool, viewed in the usual parking position. This provides in a simple way a fixation of the control device in the receptacle is achieved. The fixation requires hardly any additional installation space. The top side of the control device can be designed to be easily accessible because the fixation is realized from the bottom side.

Preferably, the power tool housing comprises a tank housing in which the fuel tank is embodied and the receptacle is embodied in the tank housing. The receptacle for the control device can be embodied preferably integrally on the tank housing. In this context, the tank housing is advantageously a cast part, in particular an injection-molded part of plastic material. No additional components are therefore required for the receptacle. The receptacle can be arranged on the tank housing laterally adjacent to the fuel tank in an area which cannot be utilized for the fuel tank, for example, because the area is exposed to the risk of becoming mechanically damaged. Mechanical damage is less critical for the control device because the control device is mechanically of a robust configuration.

A simple configuration is achieved when the control device is separated from the fuel tank by a wall of the tank housing. In this context, the fuel tank preferably adjoins one face of this wall and the receptacle for the control device adjoins the opposite face of said same wall. Double walls are therefore avoided. The wall of the fuel tank is at the same time utilized as a wall for the receptacle of the control device. This provides for a reduced total weight of the power tool. The fuel tank is advantageously vibration-decoupled from the internal combustion engine by means of at least one anti-vibration element. By arranging the control device on the tank housing, which also forms the fuel tank, the control device is also vibration-decoupled from the internal combustion engine. In this way, vibration loading of the control device can be kept relatively minimal.

The power tool comprises advantageously an air filter device that comprises at least one filter element. A plurality of filter elements may also be advantageous. In addition to the filter element, the air filter device can comprise at least one centrifugal separator. Viewed in the usual parking position, the control device is advantageously arranged underneath the air filter device. Particularly preferred, the air filter device is arranged above the fuel tank and above the control device. At least one plug contact is advantageously accessible from a side of the power tool and/or from above when an air filter cover of the power tool has been removed. The air filter cover must be frequently removed by the operator for cleaning the air filter device and is therefore usually easily demountable. Preferably, when the air filter cover is removed, above the control device an open space is formed which is open toward the longitudinal side of the power tool. The opening of the open space toward the longitudinal side is advantageously so large that an operator can grip with two fingers a connecting plug plugged into the control device and can remove the connecting plug from the plug contact.

When the air filter device is at least partially removed, a plug contact of the control device is advantageously accessible from the top face. Accessibility from the top face means in this context that, with at least partially removed air filter device in the usual parking position, no other component is located vertically above the control device. The air filter device is usually easily demounted because the air filter device must be cleaned regularly. By arranging the control device underneath the air filter device, the control device is protected by the air filter device in upward direction and is at least partially covered. In this way, accidental damage of the control device by the operator during usual operation, in particular partial removal of connecting plugs from the control device, can be substantially prevented, even when the air filter cover is removed. In order to obtain access to the control device, for example, for diagnostic purposes or for exchange of electric components, only the air filter device must be removed at least partially. Preferably, a filter element and an air filter bottom of the air filter device must be removed. With at least partially removed air filter device, the control device is then accessible from the top face of the power tool so that the operator can grip simply a connecting plug which is plugged into the control device. By the arrangement of the control device laterally adjacent to the fuel tank, the control device is preferably arranged near a longitudinal side, in particular on a longitudinal side of the power tool, so that the operator can access from above and from a lateral direction the top side of the control device.

Advantageously, at least one operating element for operating the internal combustion engine is arranged on the grip. The grip is preferably a rear grip or a top grip. Such a grip is advantageously oriented in longitudinal direction of the power tool. The longitudinal center axis of the grip is positioned in a longitudinal plane of the power tool. The longitudinal plane is oriented vertically in the parking position and contains the longitudinal center axis of the grip. Relative to the longitudinal plane, the control device in the parking position is arranged laterally adjacent to the fuel tank. In this way, the control device can be arranged in an installation space which is usable only with difficulty for other components. By the arrangement laterally adjacent or laterally next to the fuel tank, also a beneficial guiding of the connecting lines of the power tool is provided. In particular, short connecting lines can be realized to a fuel valve and a spark plug of the internal combustion engine. The electric components are usually arranged adjacent to or above the control device so that the connecting lines can be extended away from the top side of the control device to the electric components. In this way, comparatively short connecting lines can be provided.

The control device is advantageously of a comparatively narrow design. The control device comprises a width that is measured horizontally in the parking position in a direction perpendicular to the longitudinal plane. The width of the control device is advantageously less than 70%, in particular less than 50%, of the width of the fuel tank that is measured horizontally in the parking position in a direction perpendicular to the longitudinal plane. The width of the control device and the width of the fuel tank are respectively the maximum width, i.e., the greatest width extension that can be measured and horizontally in the parking position in a direction perpendicular to the longitudinal plane. Advantageously, the control device is arranged such that its length, measured and horizontally in the parking position in a direction parallel to the longitudinal plane, is greater than the width of the control device. The length amounts advantageously to at least twice the width of the control device. Since the control device in transverse direction of the power tool is comparatively narrow, the fuel tank can be designed to be comparatively wide so that only a comparatively minimal height is provided for a sufficient volume of the fuel tank. Advantageously, the fuel tank and the control device are approximately of the same size so that a uniform height of the tank housing in this area results. Particularly preferred, the fuel tank projects past the control device so that connecting plugs that are plugged into the control device are also protected from damage. The height of the control device measured in the parking position in vertical direction is advantageously longer than the width measured horizontally in the parking position in the direction perpendicular to the longitudinal plane. The height of the control device and the length of the control device can be approximately identical. The height of the control device is preferably at least twice as long as the width of the control device.

In order to achieve a simple connection of electric components to the control device, it is advantageously provided that the control device has at least one plug contact where at least one connecting plug is plugged in. The connecting plug is advantageously connected by at least one connecting line with the at least one electric component of the power tool. Advantageously, at least one connecting plug is arranged at a top side of the control device that is upwardly facing in the usual parking position. In this way, the connecting plugs are easily accessible from the top face of the power tool. Preferably, the plug contacts project upwardly past the receptacle. In this way, the accessibility of the plug contacts and the connecting plugs is further improved. The operator must not insert his hand into the receptacle in order to plug in or unplug connecting plugs from the plug contacts.

The power tool comprises advantageously an air filter compartment and a motor compartment. The air filter compartment is the space in which the air filter device is arranged at least partially. The motor compartment is the space in which the internal combustion engine is arranged. Air filter compartment and motor compartment refer to at least partially enclosed spaces in the power tool housing of the power tool. On a housing wall between the air filter compartment and the motor compartment advantageously at least one holder for a connecting line is secured. In the holder, at least one connecting line can be fixed and thereby can be guided well. Due to the defined guiding action of the connecting line, damage of the connecting line in operation, for example, due to vibrations and relative movements of the components of the power tool relative to each other, is prevented. The connecting line is advantageous secured in the holder by being snapped in.

The control device is preferably an engine control unit that controls at least one electric component of the internal combustion engine. The internal combustion engine comprises advantageously a spark plug and a plug contact of the control device is connected by means of a connecting line to the spark plug. A further electric component of the internal combustion engine is advantageously a generator which serves for generating electrical energy. Advantageously, a plug contact of the control device is connected by a connecting line to the generator. An electric component of the internal combustion engine is advantageously a fuel valve that serves for supply of fuel to the internal combustion engine. The fuel valve is preferably a solenoid valve. The fuel valve supplies fuel advantageously at low pressure of in particular an overpressure of 0 bar to 2 bar relative to ambient pressure. Advantageously, a plug contact of the control device is connected by a connecting line to the fuel valve. Further electric components that are connected with the control device can be a stop switch and one or a plurality of sensors of the internal combustion engine, for example, a temperature sensor and/or a pressure sensor. Particularly preferred, the power tool comprises at least one heating device for a grip and a plug contact is connected by a connecting line with the heating device. For switching on and off the heating device, advantageously a switch is provided. A beneficial arrangement and advantageous positioning of the connecting lines can be achieved when, adjacent to the control device, a receptacle for a switch of the at least one heating device is arranged on the housing. In this way, the length of the connecting line required between control device and switch is comparatively short. The switch can be positioned between the control device and a grip, in particular a grip pipe of the power tool, so that short connecting lines result.

The power tool is advantageously a motor chainsaw that comprises as a tool member a saw chain driven so as to circulate about the guide bar. The longitudinal plane of the motor chainsaw is positioned advantageously parallel to the longitudinal center plane of the guidebar. The spacing of the longitudinal center plane of the guide bar relative to the control device measured perpendicular to the longitudinal plane is advantageously at most 2 cm. The spacing is measured in this context relative to the outwardly facing exterior side of the control device. The exterior side of the control device is preferably recessed relative to the longitudinal center plane of the guide bar into the housing. However, it can also be provided that the control device is intersected by the longitudinal center plane of the guide bar and is displaced in outward direction relative to the longitudinal center plane of the guidebar. The fuel tank is advantageously displaced relative to the longitudinal center plane of the guide bar into the housing of the motor chainsaw, i.e., in the direction toward the longitudinal plane of the motor chainsaw. Preferably, the spacing of the longitudinal center plane of the guide bar relative to the fuel tank measured perpendicular to the longitudinal plane of the motor chainsaw is at least 3 cm. In this context, the spacing of the wall of the fuel tank, which is facing the longitudinal center plane of the guide bar, measured relative to the longitudinal plane of the motor chainsaw is smaller than the spacing of the longitudinal center plane of the guidebar relative to the longitudinal plane of the motor chainsaw. The fuel tank is therefore displaced relative to the longitudinal center plane of the guide bar in the direction toward the longitudinal plane of the motor chainsaw.

Advantageous embodiments may result by any combination of elements of the disclosed embodiments. An embodiment of the invention will be explained in the following with the aid of the drawings.

DESCRIPTION OF THE PREFERRED EMBODIMENTS

Figure 1:
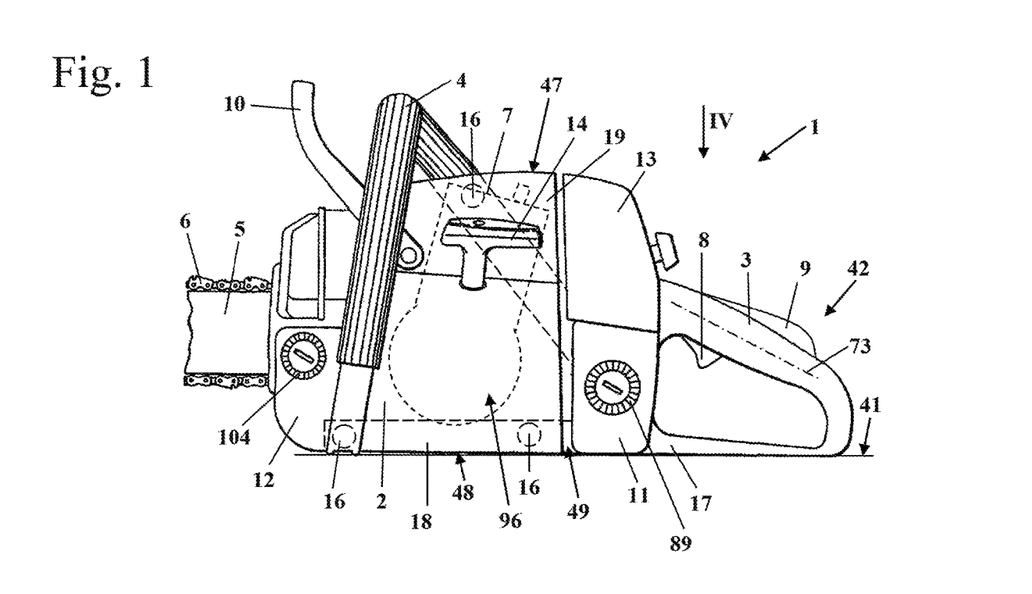
FIG. 1 is a schematic side view of a motor chainsaw.

FIG. 1 shows a motor chainsaw as an embodiment of a hand-guided power tool. In place of the motor chainsaw 1, also another hand-guided, in particular portable, power tool can be provided, for example, a cut-off machine, a trimmer, a lawnmower or the like. The motor chainsaw 1 comprises a power tool housing 2 on which a first grip 3 and second grip 4 are secured. The first grip 3 is designed as a rear grip and comprises a longitudinal center axis 73. On the rear grip 3, operating elements, i.e., a throttle trigger 8 and a throttle lock 9, are arranged for operating an internal combustion engine 7 provided in the power tool housing 2. The internal combustion engine 7 in the embodiment is designed as a two-stroke engine. The internal combustion engine 7 can also be a four-stroke engine, in particular a mixture-lubricated four-stroke engine. The internal combustion engine 7 is in particular an internal combustion engine with low-pressure injection, i.e., an internal combustion engine to which the fuel is supplied by a fuel valve at low pressure, preferably an overpressure of 0 bar to 2 bar relative to ambient pressure. Also, fuel supply by means of a carburetor can be advantageous. The carburetor can be in this context an electronic carburetor, i.e., an electronically controlled valve for a fuel supply. The internal combustion engine 7 is preferably a single cylinder engine. From the power tool housing 2, a starter grip 14 (shown in FIG. 1) is projecting that serves for starting the internal combustion engine 7.

The second grip 4 in the embodiment is designed as a grip pipe and extends transversely across the power tool housing 2. The motor chainsaw 1 comprises a guide bar 5 which projects in forward direction from the side of the power tool housing 2 opposite the first grip 3. On the guide bar 5 the saw chain 6 is arranged so as to circulate around the guide bar 5 when driven by the internal combustion engine 7. On the side of the second grip 4 which is facing the saw chain 6, a hand guard 10 is arranged. The hand guard 10 is advantageously supported pivotably relative to the power tool housing 2 and serves for actuating a braking device, not illustrated here, for braking the saw chain 6.

The power tool housing 2 comprises a tank housing 17 and a motor housing 19. A fuel tank 11 is embodied in the tank housing 17. On the tank housing 17, the grips 3 and 4 are formed. The tank housing 17 thus forms also a grip housing. The tank housing 17 is advantageously a complex component that may be assembled of several components. The fuel tank 11 is positioned adjacent to the first grip 3 on the side of the first grip 3 which is facing the internal combustion engine 7. The fuel tank 11 comprises a closure 89. A lubricant oil tank 12 which supplies oil to the saw chain 6 is embodied in the tank housing 17. The lubricant oil tank 12 is positioned adjacent to the front side of the motor chainsaw 1 from where the guide bar 5 projects forwardly. The lubricant oil tank 12 comprises a closure 104. The closures 89 and 104 are arranged on the same longitudinal side 96 of the motor chainsaw 1.

The tank housing 17 comprises in the embodiment also a beam 18 which is indicated in FIG. 1 with dashed line and which is engaged across by the motor housing 19. The motor housing 19 is supported with vibration damping on the tank housing 17 by means of anti-vibration elements 16. In the embodiment, two anti-vibration elements 16 are provided in the area of the beam 18 and a further anti-vibration element 16 is provided on the second grip 4. A different number and/or position of the anti-vibration elements 16 may be advantageous. The motor housing 19 and the tank housing 17 are separated from each other by a vibration gap 49 which is bridged by the anti-vibration elements 16 and which enables relative movement between the tank housing 17 and the motor housing 19. The motor housing 19 is supported relative to the tank housing 17 so as to be vibration-decoupled therefrom.

FIG. 1 shows the motor chainsaw 1 positioned with a bottom side 48 on a horizontal flat support surface 41; this is defined as the usual parking position 42. In the usual parking position 42, the beam 18 is positioned adjacent to the ground and the grips 3 and 4 are positioned at a spacing to the support surface 41 and can be easily gripped by the operator. In the parking position 42, above the fuel tank 11 an air filter cover 13 is arranged and covers an air filter compartment 65 illustrated in FIG. 4. The air filter cover 13 is also part of the tank housing 17.

Figure 4:
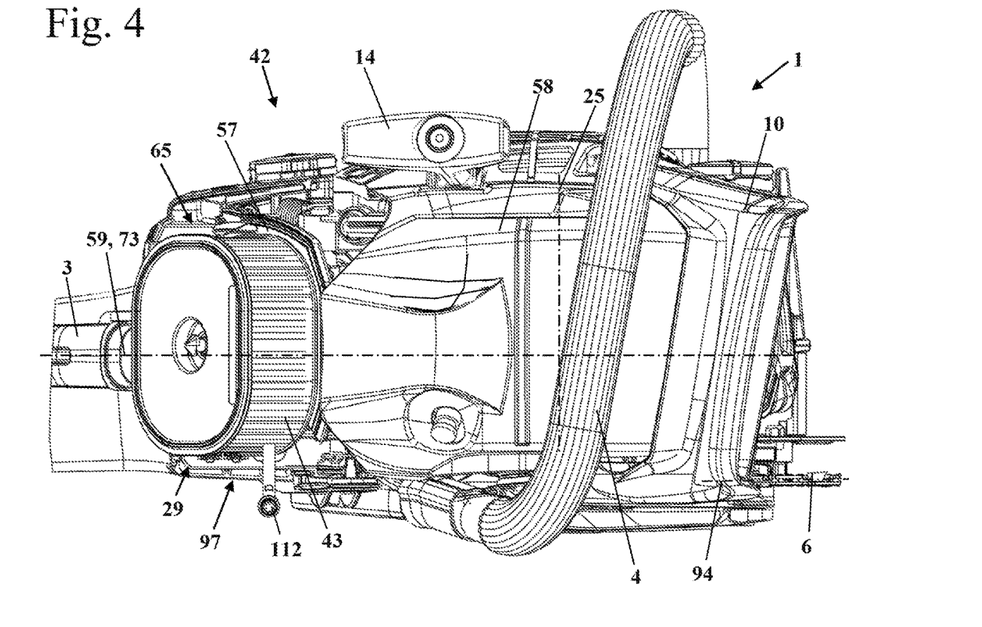
FIG. 4 is a plan view of the motor chainsaw of FIG. 1 with removed air filter cover.

The bottom side 48 of the motor chainsaw 1 is arranged in the usual parking position 42 adjacent to the support surface 41. The bottom side 48 is the downwardly facing side of the motor chainsaw 1 in the parking position 42. The bottom side 48 can be resting flat on the support surface 41. However, it can also be provided in this context that the motor chainsaw 1 has legs for supporting it on the support surface 41. In the embodiment, the motor chainsaw 1 is contacting or resting on the support surface 41 by means of the bottom area of the first grip 3 and by means of the bottom area of the second grip 4. The motor chainsaw 1 comprises a top face 47 which is facing upwardly in the parking position 42. At the top face 47, the second grip 4 extends across the power tool housing 2 as illustrated in FIGS. 1 and 4.

Figure 2:
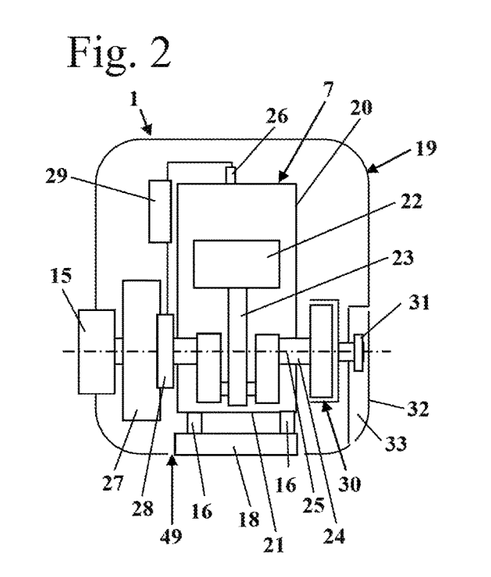
FIG. 2 is a schematic section view of the motor chainsaw of FIG. 1.

FIG. 2 shows the drive unit of the motor chainsaw 1 schematically. The internal combustion engine 7 comprises a cylinder 20 in which a piston 22 is supported reciprocatingly. The piston 22 drives by means of connecting rod 23 a crankshaft 24 which is rotatably supported about rotation axis 25 in the crankcase 21. The crankcase 21 is secured by the anti-vibration elements 16 on the beam 18. In FIG. 2, the arrangement of the anti-vibration elements 16 is only schematically shown and does not correspond to the actual spatial arrangement. Spark plug 26 is projecting into the cylinder 20 and is connected to the control device 29. The control device 29 is connected to a generator 28 which produces energy when the crankshaft 24 rotates and supplies ignition energy to the spark plug 26. The generator 28 comprises a stator fixedly secured in the crankcase 21 and not illustrated here. A rotor of the generator 28 is connected to the blower wheel 27 which is fixedly connected to the crankshaft 24. On the side of the blower wheel 27 which is opposite the crankcase 21, a starter device 15 is arranged. The starter device 15 in the embodiment is configured as a cable pull starter and comprises a starter grip 14 (FIG. 1). The starter device 15 serves for starting the internal combustion engine. On the side of the crankcase 21 opposite the starter device 15 and the blower wheel 27, a centrifugal clutch 30 is arranged by means of which the crankshaft 24 drives a sprocket wheel 31. The saw chain 6 is guided on and driven by the sprocket wheel 31. The sprocket wheel 31 is arranged in a sprocket wheel chamber 33 that is covered by a sprocket wheel cover 32, schematically illustrated in FIG. 2.

Figure 3:
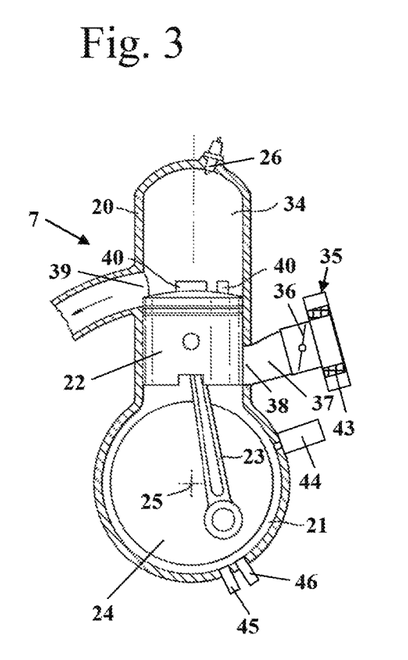
FIG. 3 is a schematic section illustration of an internal combustion engine of the motor chainsaw of FIG. 1.

FIG. 3 shows the configuration of the internal combustion engine 7 in detail. The spark plug 26 projects preferably into the combustion chamber 34 formed within the cylinder 20. The combustion chamber 34 is delimited by piston 22. In the area of bottom dead center of the piston 22 illustrated in FIG. 3, the interior of the crankcase 21 is connected by transfer passages 40 with the combustion chamber 34. An intake passage 37 opens at the cylinder 20 by means of inlet opening 38. The inlet opening 38 is controlled by the piston 22. An outlet with outlet opening 39 extends away from the combustion chamber 34; the outlet opening 39 is controlled by piston 22. For control of the air quantity supplied to the internal combustion engine 7, a throttle element 36, in particular a throttle flap or a controller drum, is arranged in the intake passage 37. The power tool comprises an air filter device 35. The air filter device 35 comprises a filter element 43 through which ambient air is sucked into the intake passage 37. Also, a plurality of filter elements can be provided for the air filter device 35. It may also be expedient that the air filter device 35 comprises one or a plurality of centrifugal separators, in particular when the power tool is a cut-off machine. The intake passage 37, as shown in the embodiment, may comprise a pipe channel. The internal combustion engine 7 can however also be a two-stroke engine that is operating with scavenging action whose intake passage is divided into a mixture channel and into an air channel.

In the embodiment, a fuel valve 44 is provided for supplying fuel and opens at the crankcase 21. The fuel valve 44 supplies fuel advantageously at low pressure, in particular an overpressure of 0 bar to 2 bar relative to ambient pressure, into the crankcase interior. Supply of fuel into the intake passage 37 or a transfer passage 40 can be advantageous also.

For controlling the internal combustion engine 7 in operation, a pressure sensor 45 and a temperature sensor 46 are advantageously provided on the crankcase 21. By means of the pressure sensor 45 and the temperature sensor 46, operating parameters of the internal combustion engine 7 can be detected and the ignition timing and the fuel quantity to be supplied can be controlled.

The control device 29 is an engine control unit that controls important components that are required for operation of the internal combustion engine 7. This is in particular the spark plug 26 and the fuel valve 44. In the embodiment, the temperature sensor 46 and the pressure sensor 45 are also connected to the control device 29. Also, further electric components of the motor chainsaw 1 can be connected to the control device 29.

In operation of the internal combustion engine 7, combustion air is sucked in through the air filter device 35 via intake passage 37 and inlet opening 38 upon upward stroke of the piston 22. During the subsequent downward stroke of the piston 22, the combustion air is compressed in the crankcase 21. Fuel is supplied at predetermined points in time via the fuel valve 44. The fuel supply is realized in particular into the interior of the crankcase 21. Upon subsequent downward stroke of the piston 22, the compressed fuel/air mixture flows from the crankcase 21 through the transfer passages 40 into the combustion chamber 34 as soon as the transfer passages 40 open toward the combustion chamber 34. In the area of top dead center of the piston 22, ignition of the fuel/air mixture in the combustion chamber 34 is realized by the spark plug 26. The subsequent combustion accelerates the piston 22 in the direction toward the crankcase 21. As soon as the outlet with outlet opening 39 is opened by the downwardly moving piston 22, the exhaust gases exit from the combustion chamber 34. Through the transfer passages 40, fresh fuel/air mixture then flows from the crankcase 21 into the combustion chamber 34.

In the embodiment, the fuel valve 44, the pressure sensor 45, and the temperature sensor 46 as well as the generator 28 and the spark plug 26 are connected to the control device 29. When servicing the power tool, it is expedient to access the data of the control device 29. For this purpose, for example, the connector of the spark plug 26 at the control device 29 can be utilized for connecting a diagnostic device, for example, an external personal computer. For exchanging electric components, it is also expedient when the control device 29 comprises electric plug contacts that are easily accessible so that a component can be unplugged from the control device 29 and a replacement component can be plugged into the control device 29.

FIG. 4 shows the motor chainsaw 1 with removed air filter cover 13. Underneath the air filter cover 13 the filter element 43 is arranged which is a round filter that is embodied as a paper filter in the embodiment. The filter element 43 is arranged on an air filter bottom 57 that covers substantially the components underneath. As also shown in FIG. 4, the control device 29, viewed in the parking position 42, is preferably arranged underneath the filter element 43 and underneath the air filter bottom 57.

The motor chainsaw 1 comprises a longitudinal plane 59. The longitudinal plane 59 contains the longitudinal center axis 73 of the first grip 3 and extends in the illustrated parking position 42 vertically, i.e., it extends perpendicular to the paper plane in the illustration of FIG. 4. In the motor chainsaw 1, the longitudinal plane 59 extends parallel to a longitudinal center plane 94 of the guide bar 5. The longitudinal center plane 94 is schematically indicated in FIG. 4. The longitudinal center plane 94 extends through a guide groove arranged on the guide bar 5 (FIG. 1) and intersects the saw chain 6 across its entire length. The longitudinal plane 59 extends perpendicular to the axis of rotation 25, illustrated schematically in FIG. 4, of the crankshaft 24.

Figure 5:
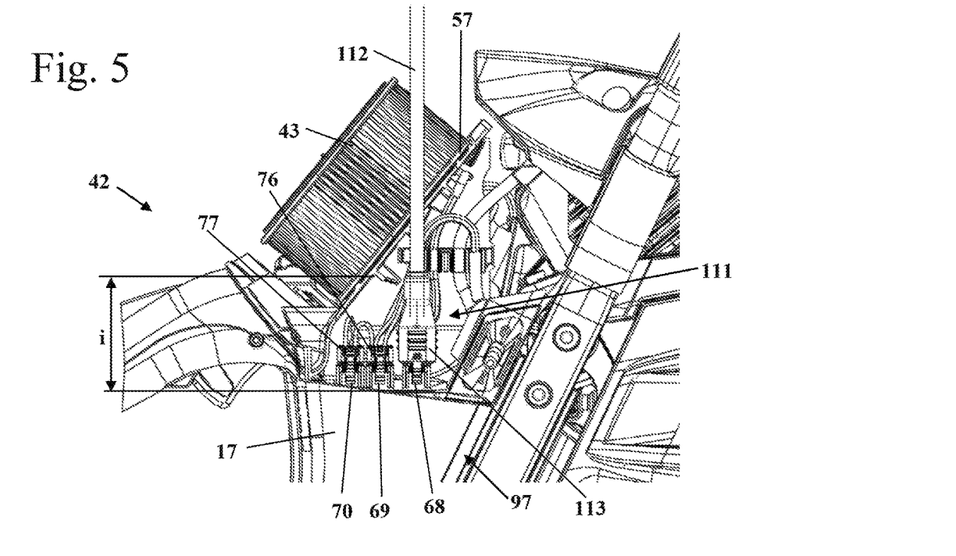
FIG. 5 is a side view of the motor chainsaw of FIG. 1 with removed air filter cover.

FIG. 5 shows the motor chainsaw 1 in a side view with removed air filter cover 13. As shown in FIG. 5, at the plug contact 68 a diagnostic line 112 is plugged in with a connecting plug 113. The diagnostic line 112 serves advantageously for connecting a diagnostic device, such as a personal computer, to the control device 29. The diagnostic line 112 is also shown in FIG. 4. At the longitudinal side 97 of the motor chainsaw 1 an opening 111 is formed when the air filter cover 13 is removed; the opening 111 is extending above the control device 29 (FIG. 4). Viewed in the parking position 42, the opening 111 comprises a greatest height i which is measured in vertical direction and is advantageously at least 4 cm, in particular at least 5 cm, preferably at least 6 cm long. The height i must not be constant in this context across the entire width of the opening 111 but, in particular in the rim areas of the opening 111, can also be smaller. The opening 111 is designed such that an operator can access from the longitudinal side 97 through the opening 111 the plug contacts 68, 69, 70 and in particular also the plug contact 67, not shown in FIG. 5, and can plug in or unplug connecting plugs 113, 76, 77. For this purpose, it is advantageous that no removal of the filter element 43 and/or of the air filter bottom 57 is required. The connecting plugs 76, 77 at the plug contacts 69 and 70 will be explained in the following in more detail. The air filter cover 13, in the state secured on the motor chainsaw 1, covers the opening 111 substantially, in particular completely, so that the control device 29 is protected from soiling and damage.

Figure 6:
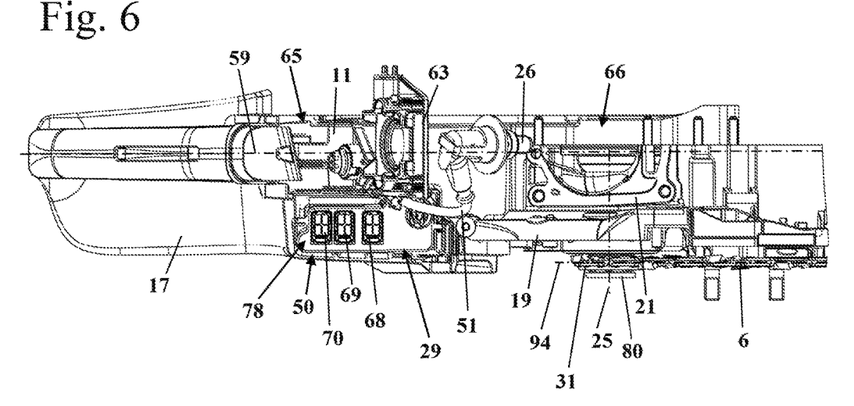
FIG. 6 is a plan view onto a portion of the tank housing and a portion of the motor housing of the motor chainsaw of FIG. 1.

FIG. 6 shows a part of the tank housing 17 as well as a part of the motor housing 19 with removed filter element 43 and removed air filter bottom 57. In FIG. 6, the crankcase 21 of the internal combustion engine 7 is partially shown. The cylinder 20 of the internal combustion engine 7 is removed in FIG. 6. FIG. 6 shows also the axis of rotation 25 of the crankshaft 24. Underneath the air filter bottom 57, the fuel tank 11 is arranged which is only partially shown in FIG. 6. The fuel tank 11 is integrally formed in the tank housing 17. Relative to the longitudinal plane 59, a receptacle 50 is formed in the tank housing 17 at a location laterally adjacent to the fuel tank 11 and is open toward the top face 47 (FIG. 1) of the motor chainsaw 1. The receptacle 50 is covered at least partially by the air filter bottom 57, the filter element 43 (FIG. 4) as well as the air filter cover 13. The control device 29 is arranged in the receptacle 50. The control device 29 is an electronic control unit which comprises a microprocessor. The control device 29 comprises an upwardly facing top side 78 in the parking position 42. Plug contacts 68, 69, 70 for providing connections with electric components of the power tool are arranged on the top side 78. As shown in FIG. 6, the plug contacts 68, 69, 70 are accessible from the top face 47 (FIG. 1) of the motor chainsaw 1 when, as shown in FIG. 6, the air filter bottom 57, the filter element 43, and the air filter cover 13 are removed. On the control device 29, a connecting line 51 for providing a connection to the spark plug 26 is connected to a further plug contact 67, shown in FIG. 7. The plug contact 67 is arranged also on the top side 78 of the control device 29.

Figure 7:
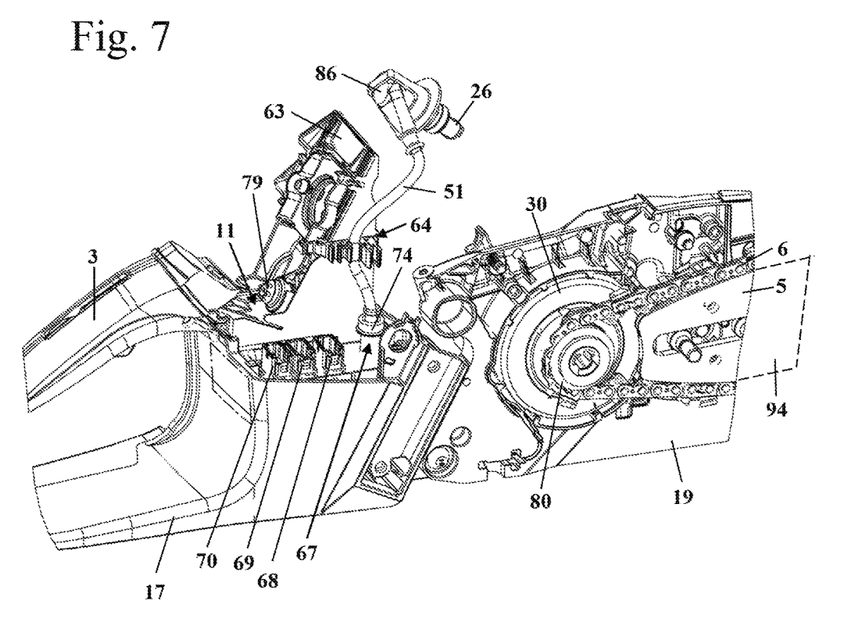
FIG. 7 shows the arrangement of FIG. 6 in a perspective illustration.

FIG. 7 shows the arrangement of FIG. 6 in perspective illustration. In FIG. 7, the longitudinal center plane 94 is also schematically shown. On the tank housing 17, a housing wall 63 is formed which, as also shown in FIG. 7, is oriented transversely, in the embodiment perpendicularly, to the longitudinal center plane 94 and to the longitudinal plane 59. In FIG. 7, a tank venting valve 79 is shown which is arranged on the upper side of the fuel tank 11 in the embodiment. The housing wall 63 separates the air filter compartment 65 from a motor compartment 66. The motor compartment 66 is the interior of the power tool housing 2 (FIG. 1) in which the internal combustion engine 7 (FIG. 1) is arranged. In FIGS. 6 and 7, a cover plate 8 is also shown which covers the sprocket wheel 31 (FIG. 6).

FIG. 7 shows the arrangement of several plug contacts 67, 68, 69, 70. In the illustration of FIG. 7, a connecting plug 74 to which the connecting line 51 is connected is plugged into the first plug contact 67. The connecting line 51 is connected with a plug 86 on which the spark plug 26 is arranged. The connecting line 51 is secured by being clamped in a holder 64. The holder 64 in the embodiment is embodied as a separate component, in particular of plastic material, and is clipped laterally onto the housing wall 63. It can also be provided that the holder 64 is embodied as a unitary part of the housing wall 63 or that it is connect in a different way to the housing wall 63.

Figure 8:
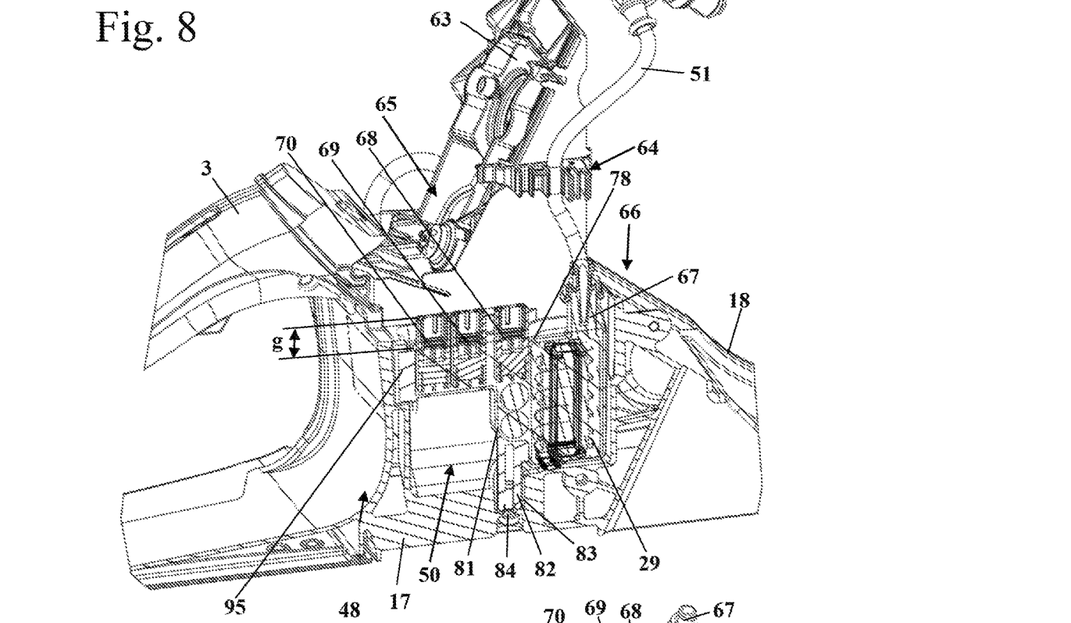
FIG. 8 is a section view of the arrangement of FIGS. 6 and 7 in a section plane that is parallel to a longitudinal plane of the motor chainsaw.

FIG. 8 shows the arrangement of the control device 29 in the receptacle 50 in detail. The control device 29 in the illustration of FIG. 8 is shown in section view. The control device 29 comprises a control device housing 81 in which the components of the control device 29 are preferably embedded or potted by means of a potting compound. In this way, the electronic components are positioned and secured in the control device housing 81 and, at the same time, are protected from environmental influences such as moisture, high temperatures or the like.

Figure 9:
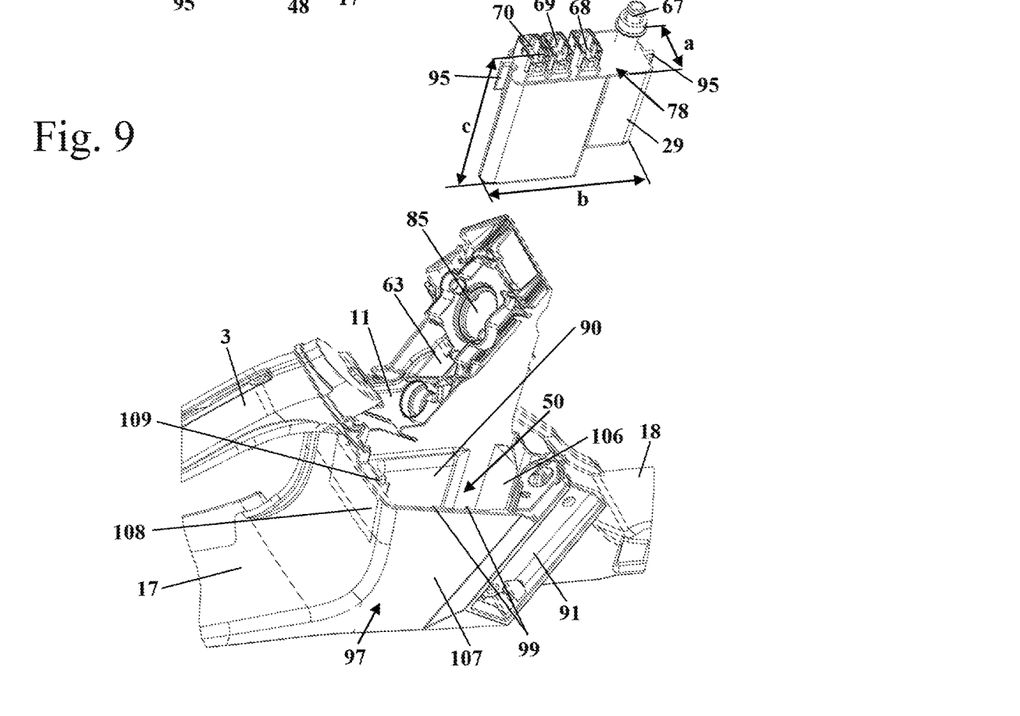
FIG. 9 shows the tank housing and the control device of the motor chainsaw in exploded view.

As shown in FIG. 8, the control device 29 in the embodiment has a projection 82 which projects into a recess 83 at the bottom of the receptacle 50. In this way, the control device 29 is pre-positioned in the receptacle 50. For positioning the control device 29 in longitudinal direction, ribs 95 are provided on the side of the control device 29 which is facing in the direction of the grip 3 and on the side which is facing in opposite direction. In FIG. 8, one of the ribs 95 is shown in section view. FIG. 9 shows both ribs 95 in a perspective view.

As shown in FIG. 8, the control device 29 is secured in the receptacle 50 by a fastening screw 84. The fastening screw 84 is screwed in from the bottom side 48 of the motor chainsaw 1 into the control device 29. In this way, the control device 29 is fixed within the receptacle 50. The fastening screw 84 is easily accessible so that the control device 29 can be easily fixed or can be easily detached and removed from the receptacle 50. The fastening screw 84 acts in the direction in which also pulling-out forces are applied on the plug contacts 67, 68, 69, and 70. The fastening screw 84 prevents in this way that the control device 29 can move out of the receptacle 50 when the connecting plugs are pulled off the plug contacts 67, 68, 69, 70.

As shown in FIG. 8, the plug contacts 67, 68, 69, 70 project past the top side 78 of the control device 29. In the embodiment, the plug contacts 68, 69, 70 have a projecting length g relative to the top side 78 that measures at least 5 mm. The plug contact 67 is suitable for high voltage and can have an even longer projecting length relative to the top side 78.

FIG. 9 shows the configuration of the receptacle 50 in detail. The receptacle 50 is designed as a pocket that is open in upward direction. The receptacle 50 is delimited by a forward sidewall 106 which is facing away from the rear grip 3; a sidewall 107 provided on the longitudinal side 97; a rear sidewall 108 which is facing the rear grip 3; and a wall 90. The sidewalls 106, 107, 108 are exterior walls of the tank housing 17. The wall 90 is an intermediate wall of the tank housing 17 and separates the receptacle 50 from the interior of the fuel tank 11. The receptacle 50 and the fuel tank 11 adjoin in this context opposite faces of the wall 90. The sidewalls 106, 107, and 108 and the wall 90 are positioned transversely, in particular perpendicularly, to each other so that the receptacle 50 in a section view, taken horizontally in the usual parking position 42, has an approximately rectangular cross-section. In the embodiment, the sidewalls 106 and 108 are oriented approximately perpendicularly to the longitudinal plane 59 (FIG. 6); the sidewall 107 and the wall 90 are oriented approximately parallel to the longitudinal plane 59. However, a slightly slanted arrangement of the receptacle 50 in the tank housing 17 may be advantageous also.

The control device 29 can be inserted from above into the receptacle 50 when the air filter bottom 57 (FIG. 4) is removed. The ribs 95 position the control device 29 in the receptacle 50. On the rear sidewall 108, a receptacle 109 for a rib 95 is provided. The receptacle 109 is formed by two webs between which the rib 95 is guided. A corresponding receptacle is advantageously formed on the opposite sidewall 106 for the other oppositely oriented rib 95.

Figure 10:
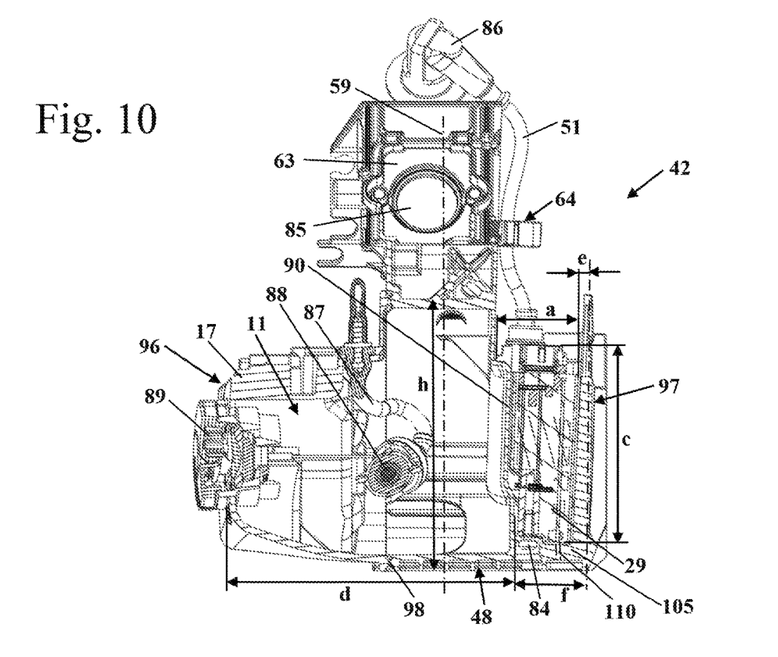
FIG. 10 is a section view of the arrangement of FIGS. 6 and 7 perpendicular to a longitudinal plane of the motor chainsaw.

The control device 29 relative to the longitudinal plane 59 is arranged laterally adjacent to the fuel tank 11, as also shown in FIG. 10. The lateral direction in regard to "laterally adjacent" is defined in this context by a direction perpendicular to the longitudinal plane 59. In the embodiment, a receptacle 91 for an end of the second grip 4 is formed on the tank housing 17. The receptacle 50 is arranged on the side of the receptacle 91 that is facing the grip 3.

The control device 29 has a width a which is measured perpendicular to the longitudinal plane 59. The longitudinal plane 59 and the width a are shown also in FIG. 10. The width a is the total width of the control device 29. The width a is the smallest extension of the control device 29. The control device 29 has a length b which is measured horizontally in the parking position 42 in a direction parallel to the longitudinal plane 59 (FIG. 10). The length b is greater than the width a. Advantageously, the length b is at least twice as long as the width a. The control device 29 has a height c which is measured in the parking position 42 in vertical direction, i.e., perpendicular to the support surface 41. The height c is measured in a direction parallel to the longitudinal plane 59 and in a direction perpendicular to the width a and perpendicular to the length b. The height c is also significantly greater than the width a and is advantageously at least twice as long as the width a. The length b and the height c can be approximately identical. Advantageously, the length b amounts to 0.7 times to 1.3 times the height c. The length b is the total length of the control device 29. The height c is the total height of the control device 29 including the height of the plug contacts 67, 68, 69, 70.

As also shown in FIG. 9, the housing wall 63 in the embodiment has an opening 85. The intake passage 37 of the internal combustion engine 7 (FIG. 3) is guided through the opening 85. The combustion air is guided from the air filter device 35 to the internal combustion engine 7 (FIG. 3) through the opening 85. The width a, the length b, and the height c can correspond to the width, length, and height of the control device 29. However, it can also be advantageous to arrange the control device 29 slantedly relative to the longitudinal plane 59, in particular slanted by a few degrees in one or more directions. In this way, the width a, length b, and/or height c measured perpendicular or parallel relative to the longitudinal plane 59 can be longer or shorter than the total width, total length, and/or total height of the control device 29.

FIG. 10 shows that the control device 29 is arranged laterally adjacent to the fuel tank 11 in the tank housing 17. The fuel tank 11 and the receptacle 50 are formed as integral parts on a housing part of the tank housing 17. A fuel line 87 is extending into the fuel tank 11 and has at its end a suction head 88 by means of which fuel is supplied to the fuel valve 44 (FIG. 3). The fuel tank 11 comprises the closure 89 which is arranged on the longitudinal side 96 of the tank housing 17. The receptacle 50 adjoins or borders the opposite longitudinal side 97. The fuel tank 11 and the receptacle 50 taken together extend across the entire width of the tank housing 17. The fuel tank 11 and the receptacle 50 are separated from each other by a wall 90 which is also integrally formed on the tank housing 17. In the embodiment, the receptacle 50 together with the wall 90 is formed as one part as an injection-molded part. The fuel tank 11 is comprised of two shells which are connected to each other at a joint 98, in particular are welded (fused) to each other. In FIG. 10, also the fastening screw 84 is shown which is screwed into the control device 29.

As is shown schematically in FIG. 10, the receptacle 50 has a bottom 105 which closes off the receptacle 50 in the direction of the bottom side 48 of the motor chainsaw 1. The fastening screw 84 is projecting through the bottom 105. The bottom 105 of the receptacle 50 has an opening 110. Liquid such as condensed water can drain through the opening 110 downwardly from the receptacle 50.

The control device 29 is positioned and secured in the receptacle 50 advantageously by means of the ribs 95 (FIG. 9) and in the area of the fastening screw 84 (FIG. 10). In the other areas, the control device 29 advantageously has a spacing relative to the receptacle 50. In this way, dimensional tolerances of the control device 29 can be compensated and the control device 29 can be produced with comparatively minimal requirements with respect to dimensional precision.

The fuel tank 11 comprises a height h that is measured vertically in the parking position 42 and in a direction parallel to the longitudinal plane 59. In this context, the height h is the total height of the fuel tank 11. The height h amounts advantageously to 0.7 times to 1.3 times the height c of the control device 20. Since the fuel tank 11 and the control device 29 are approximately of the same height, an approximately planar upper side results in this area of the tank housing 17. Advantageously, the height h of the fuel tank 11 is longer than the height c of the control device 29 so that the fuel tank 11 projects past the control device 29 and protects the plug contacts 67, 68, 69, 70 from damage in this way. Preferably, the height h of the fuel tank 11 is designed such that the fuel tank 11 also projects past connecting plugs that are plugged into the plug contacts 67, 68, 69, 70.

The tank housing 17 comprises a width d which is measured horizontally and in a direction perpendicular to the longitudinal plane 59 which is significantly longer than the width a of the control device 29. The width a of the control device 29 advantageously amounts to less than 70%, in particular less than 50%, of the width d of the fuel tank 11 measured perpendicular to the longitudinal plane 59 and horizontally in the parking position 42. The width d is in this context the greatest width of the tank housing 17 measured horizontally in the parking position 42 in a direction perpendicular to the longitudinal plane 59. The width d is the total width of the tank housing 17.

Figure 11:
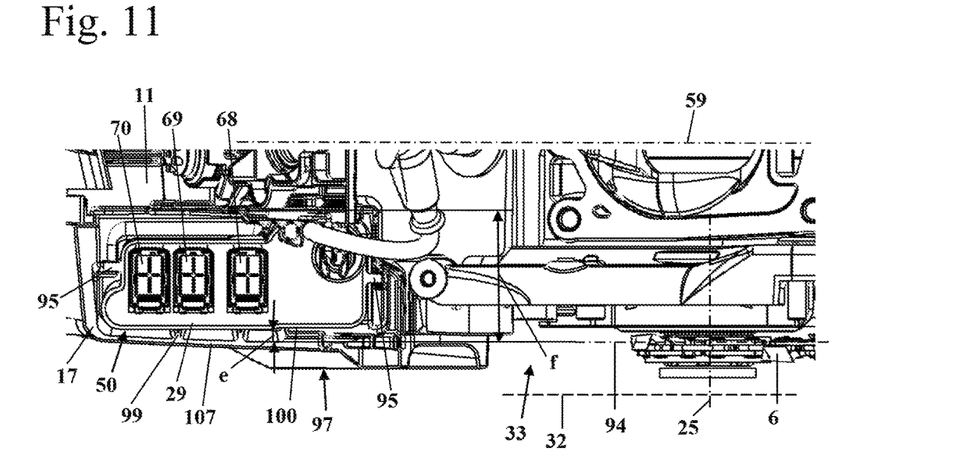
FIG. 11 is an enlarged detail illustration of the area of the control device of FIG. 6.

FIG. 11 shows the arrangement of the receptacle 50 with the control device 29 relative to the saw chain 6. By arranging the control device 29 on the longitudinal side 97 of the motor chainsaw 1, where also the guide bar 5 with the saw chain 6 is arranged, the fuel tank 11 can be arranged so as to be laterally displaced in the direction toward the longitudinal plane 59 (FIG. 10). Due to the arrangement of the control device 29 on the longitudinal side 97, the tank housing 17 in this area can project farther outwardly. In this way, the available installation space is enlarged. A slim and narrow configuration of the motor chainsaw 1 is provided. Since in any case the sprocket wheel chamber 33 is arranged adjacent to the control device 29, an enlargement of the tank housing 17 in this area does not present an impairment in operation. The sprocket wheel cover 32 is shown in FIG. 11 only schematically.

It is provided that the spacing e of the control device 29 relative to the longitudinal center plane 94 of the guide bar 5, measured perpendicular to the longitudinal plane 59, amounts to at most 2 cm, in particular at most 1.5 cm. In a preferred embodiment, the control device 29 can be displaced relative to the longitudinal center plane 94 in outward direction, i.e., in a direction away from the longitudinal plane 59 of the motor chainsaw. The spacing e in this context is measured relative to the exterior side 100 of the control device 29 neighboring the longitudinal side 97.

As shown in FIG. 11, on the sidewall 107 of the receptacle 50 provided on the tank housing 17, support ribs 99 are integrally formed which project into the receptacle 50 and support the longitudinal side 100 of the control device 29. The support ribs 99 are also shown in FIG. 9. Accordingly, the control device 29 is not resting flat against the sidewall 107 but has a spacing relative to the sidewall 107. The control device 29 has advantageously also a spacing relative to the sidewalls 106 and 108 and to the wall 90, which are shown in FIG. 9. Since the control device 29 has a gap relative to the sidewalls 106, 107, 108 and the wall 90 of the receptacle 50, heat can be easily dissipated. The support ribs 99 reinforce at the same time the tank housing 17 in the area of the receptacle 50.

The longitudinal center plane 94 has a spacing f relative to the fuel tank 11 which is advantageously at least 1.5 cm, in particular at least 2 cm, preferably at least 3 cm. The spacing f is measured relative to the wall 90, shown in FIG. 10, and in particular to the area of the wall 90 that is farthest removed from the longitudinal plane 59. The spacing f and the spacing e are also shown in FIG. 10.

Figure 12:
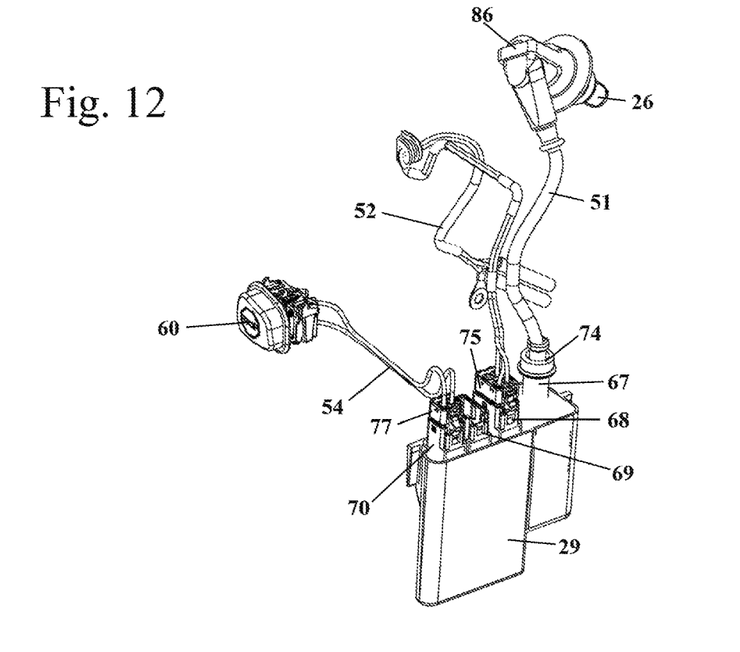
FIG. 12 is a perspective illustration of the control device and of the connecting lines of the motor chainsaw.

FIG. 12 shows further connecting lines 52 and 54 of the motor chainsaw 1. The connecting line 52 serves for connecting the control device 29 to the generator 28 (FIG. 2) that also constitutes an electric component of the motor chainsaw 1. A connecting plug 75 is arranged on the connecting line 52 and is plugged into the plug contact 68. The motor chainsaw 1 comprises preferably a stop switch 60 which serves for shorting the ignition and which is connected by connecting line 54 with a connecting plug 77. The connecting plug 77 is plugged into the plug contact 70. All connecting lines 51, 52, and 54 are multicore cables in the embodiment.

Figure 13:
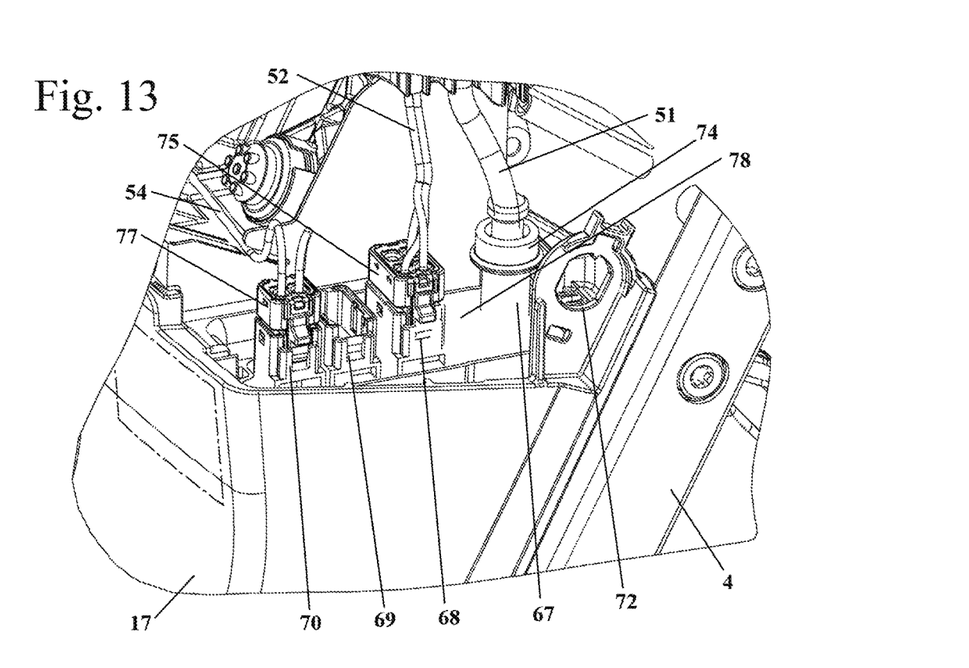
FIG. 13 is an enlarged detail illustration of the area of the control device of the motor chainsaw with connecting lines according to FIG. 12.

FIG. 13 shows that in the embodiment adjacent to the control device 29, i.e., adjacent to the plug contact 67 of the control device 29, a receptacle 72 is formed on the tank housing 17 which will be explained in more detail in the following. In FIG. 13 the second grip 4 is also attached to the tank housing 17, i.e., mounted in the receptacle 91 of the tank housing 17 shown in FIG. 9.

Figure 14:
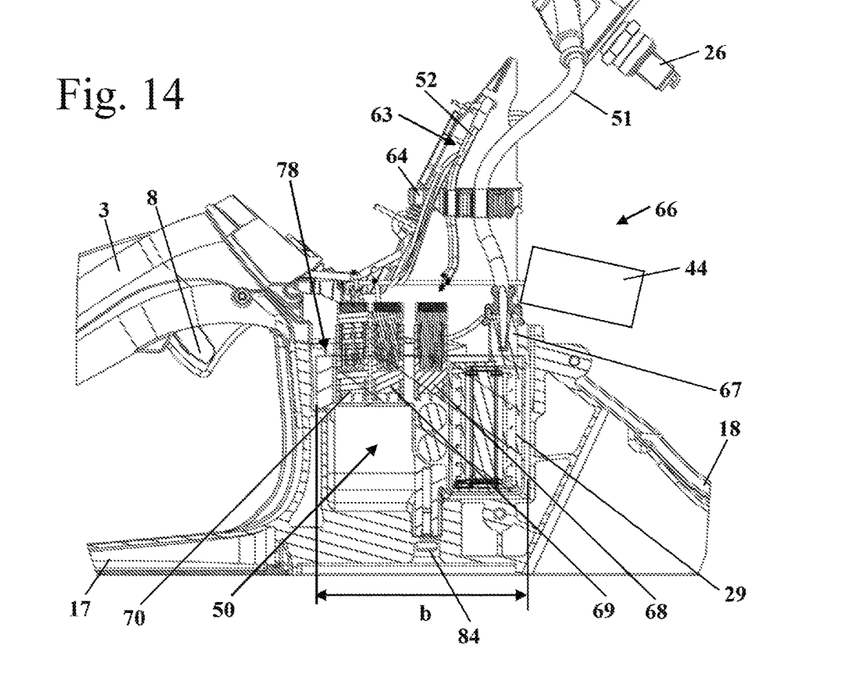
FIG. 14 is a section view of the control device of FIG. 13 parallel to the longitudinal plane.
Figure 15:
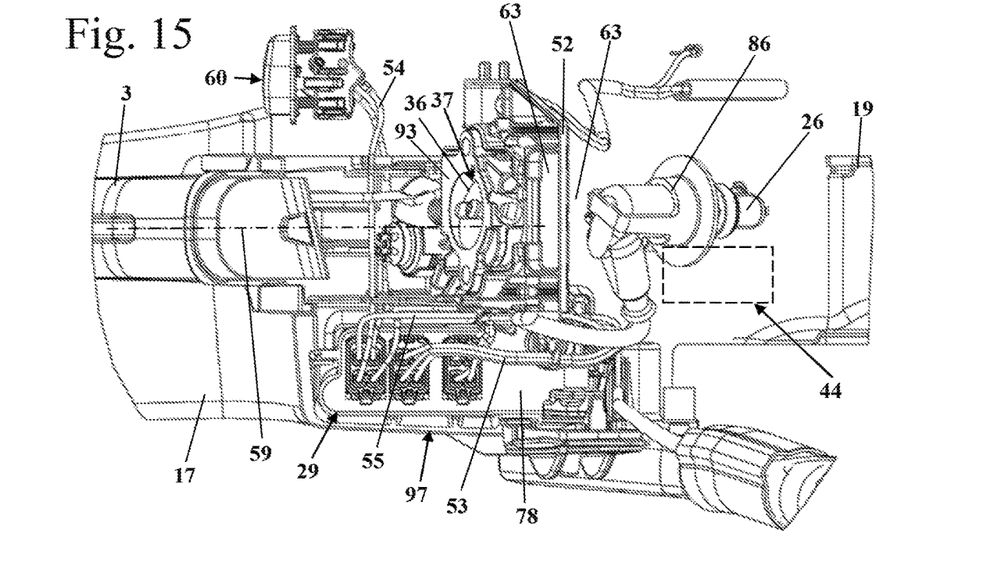
FIG. 15 is a plan view of the tank housing with control device and connecting lines arranged thereat as well as electric components.

In FIG. 14, the arrangement of the control device 29 in the receptacle 50 and the length b of the control device 29 are shown. The fuel valve 44 is only schematically shown. As shown in FIGS. 14 and 15, the connecting line 52 which serves for connecting the control device 29 to the generator 28 is guided along the housing wall 63 in the direction of the opposite longitudinal side of the motor chainsaw 1. The connecting line 52 is guided, viewed in the parking position 42, above a throttle housing 93. In the throttle housing 93 the intake passage 37 is formed. In the throttle housing 93 a throttle element 36, in the embodiment a throttle flap, is pivotably supported. The section of the connecting line 52 arranged in FIG. 14 on the side of the tank housing 17 located to the rear is not illustrated in FIG. 14.

FIG. 15 shows also the connecting line 53 which serves for connecting the control device 29 to the fuel valve 44. In the illustration of FIG. 15 the fuel valve 44 is only schematically shown. In FIG. 15, additionally a connecting line 55 is shown which serves for connecting the control device 29 with a heating device for the grips 3, 4.

Figure 16:
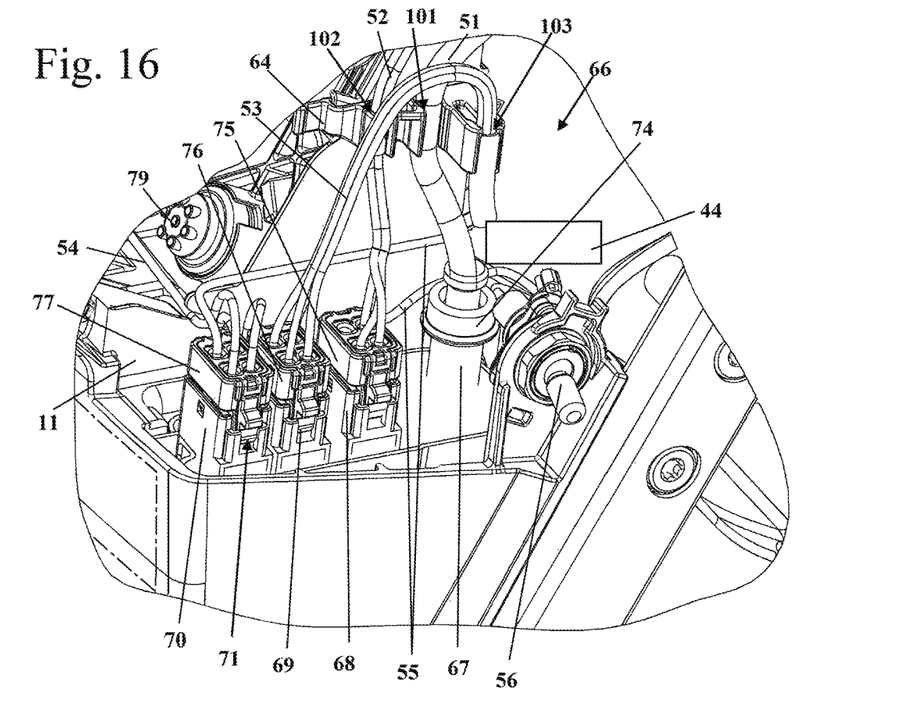
FIG. 16 is an enlarged perspective illustration of the area of the control device of the arrangement of FIG. 15.

FIG. 16 shows in detail the arrangement of the connecting lines and connecting plugs in the embodiment. The connecting plug 74 for the spark plug 26 (FIG. 15) is plugged into the plug contact 67. The connecting line 51 is arranged in a receptacle 101 of the holder 64. The holder 64 comprises in the embodiment three receptacles 101, 102, 103. The receptacle 101 is arranged centrally between the receptacles 102 and 103. The connecting line 52 for the generator 28 is snapped into In the receptacle 101. The receptacle 102 is arranged on the side of the receptacle 101 which is facing the grip 3 and the receptacle 103 is arranged on the side of the receptacle 101 which is facing away from the grip 3 and is facing the motor compartment 66. The connecting line 53 is plugged in with a connecting plug 76 into the plug contact 69. From the connecting plug 76 the connecting line 53 extends first, viewed in the parking position 42, upwardly and across the area of the receptacles 101 and 102. The connecting line 53 is then guided from top to bottom through the receptacle 103 and is secured therein by being snapped in. From the receptacle 103 the connecting line 53 is then guided to the fuel valve 44, illustrated schematically in FIG. 16, in the motor compartment 66. The connecting line 54 is extending from the connecting plug 77 transversely to the longitudinal plane 59 (FIG. 15) in the direction toward the opposite longitudinal side of the motor chainsaw 1 to the stop switch 60.

In the embodiment, for the heating device for the grips 3, 4 a connecting line 55 is provided which is of a two-core design and is connected also to the connecting plug 77. Accordingly, a common connecting plug 77 for the connecting line 54 for the stop switch 60 and for the connecting line 55 for the heating device for the grips is provided. The connecting line 55 is guided to a switch 56 which is secured in the receptacle 72 (FIG. 13) of the tank housing 17 and projects to the exterior side of the power tool housing 2. As also shown in FIG. 16, the connecting plugs 75, 76, 77 are secured in the plug contacts 68, 69, 70 by locking devices 71.

Figure 17:
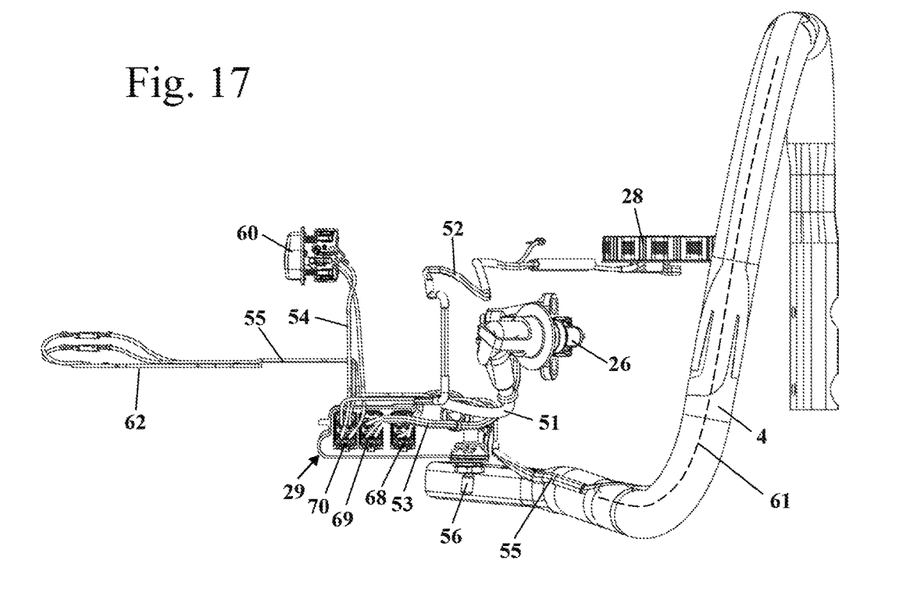
FIG. 17 is a plan view of the control device with connecting lines and electric components.

FIG. 17 shows the arrangement of all connecting lines and electric consumers of the motor chainsaw 1 in the embodiment. The pressure sensor 45 and the temperature sensor 46 in the embodiment are arranged in a common housing with the fuel valve 44 and therefore are not visible. The electric connection of pressure sensor 45 and temperature sensor 46 is realized by connecting line 53 by means of which also the fuel valve 44 is connected to the control device 29. In FIG. 17 the generator 28 is also shown which is connected by connecting line 52 with the control device 29. In FIG. 17 also the heating device 61 for the second grip 4 as well as a heating device 62 for the first grip 3 are shown.

Figure 18:
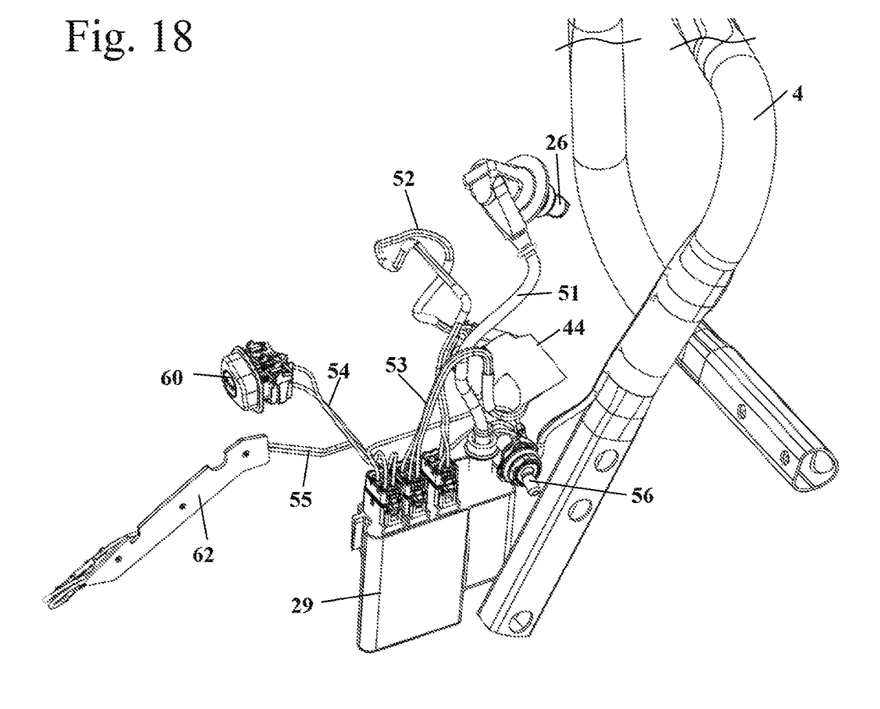
FIG. 18 is a perspective illustration of the arrangement of FIG. 17.

The heating device 62 is also shown in FIG. 18. The heating devices 61 and 62 are connected by connecting lines 55 with the switch 56 and the control device 29. By actuating the switch 56, the operator can switch on and off both heating devices 61 and 62.

The specification incorporates by reference the entire disclosure of German priority document 10 2015 016 485.6 having a filing date of Dec. 15, 2015.

While specific embodiments of the invention have been shown and described in detail to illustrate the inventive principles, it will be understood that the invention may be embodied otherwise without departing from such principles.

What is claimed is:

1. A hand-guided power tool comprising:
a power tool housing;
an internal combustion engine arranged in the power tool housing and configured to drive a tool member of the power tool;
a fuel tank;
at least one electric component;
a control device embodied as an electronic control unit that is connected to the at least one electric component of the power tool and is configured to control the at least one electric component;
a grip and at least one operating element arranged on the grip, wherein the at least one operating element is configured to operate the internal combustion engine;
wherein the power tool has a top face which, when parking the power tool in a usual parking position on a flat horizontal support surface, is facing upwardly;
wherein the power tool has a vertical longitudinal plane when viewing the power tool in the usual parking position, wherein a longitudinal center axis of the grip is located in the vertical longitudinal plane of the power tool;
wherein, when viewing the power tool in the usual parking position, the control device is positioned laterally adjacent to the fuel tank so that the fuel tank and the control device, viewed in a viewing direction perpendicular to the vertical longitudinal plane of the power tool, overlap each other at least partially.

2. The power tool according to claim 1, wherein the power tool housing comprises a receptacle that, when viewing the power tool in the usual parking position, is open in an upward direction, wherein the control device is arranged in the receptacle.

3. The power tool according to claim 2, wherein the power tool housing comprises a tank housing, wherein the fuel tank is embodied in the tank housing and the receptacle is embodied in the tank housing.

4. The power tool according to claim 3, wherein the tank housing comprises a wall and the control device is separated from the fuel tank by the wall of the tank housing.

5. The power tool according to claim 1, further comprising an air filter device comprising at least one filter element, wherein the control device, when viewing the power tool in the usual parking position, is arranged underneath the air filter device.

6. The power tool according to claim 1, wherein the control device has a width measured horizontally in the usual parking position in a direction perpendicular to the vertical longitudinal plane of the power tool and wherein the fuel tank has a width measured horizontally in the usual parking position in the direction perpendicular to the vertical longitudinal plane of the power tool, wherein the width of the control device amounts to less than 70% of the width of the fuel tank.

7. The power tool according to claim 1, wherein the control device has a length measured horizontally in the usual parking position in a direction parallel to the vertical longitudinal plane of the power tool and wherein the control device has a width measured horizontally in the usual parking position in a direction perpendicular to the vertical longitudinal plane of the power tool, wherein the length of the control device is longer than the width of the control device.

8. The power tool according to claim 1, wherein the control device has a width measured horizontally in the usual parking position in a direction perpendicular to the vertical longitudinal plane of the power tool and wherein the control device has a height measured vertically in the usual parking position, wherein the height of the control device is longer than the width of the control device.

9. The power tool according to claim 1, wherein the control device comprises at least one plug contact and at least one connecting plug plugged into the at least one plug contact, wherein the at least one connecting plug is connected by at least one connecting line with the at least one electric component of the power tool.

10. The power tool according to claim 9, wherein the at least one connecting plug is arranged on a top side of the control device which is facing upwardly in the usual parking position.

11. The power tool according to claim 9, wherein the power tool housing comprises an air filter compartment and a motor compartment, wherein a housing wall of the power tool housing is arranged between the air filter compartment and the motor compartment and wherein at least one holder for the at least one connecting line is arranged in the at least one holder.

12. The power tool according to claim 1, wherein the internal combustion engine comprises a spark plug and wherein the control device comprises a plug contact connected by a connecting line to the spark plug.

13. The power tool according to claim 1, wherein the at least one electric component is a generator generating electric energy and wherein the control unit comprises a plug contact connected by a connecting line to the generator.

14. The power tool according to claim 1, wherein the internal combustion engine comprises a fuel valve supplying fuel to the internal combustion engine and wherein the control device comprises a plug contact connected by a connecting line to the fuel valve.

15. The power tool according to claim 1, wherein the at least one electric component is a heating device for the grip of the power tool and wherein the control device comprises a plug contact connected by a connecting line to the heating device.

16. The power tool according to claim 1, wherein the power tool is a motor chainsaw and the tool member is a saw chain circulating about a guide bar of the motor chainsaw, wherein the guide bar has a longitudinal center plane, wherein a first spacing of the longitudinal center plane of the guide bar relative to the control device is measured in a direction perpendicular to a vertical longitudinal plane of the power tool and wherein the first spacing is at most 2 cm.

17. The power tool according to claim 16, wherein a second spacing of the longitudinal center plane of the guide bar relative to the fuel tank is measured perpendicular to the vertical longitudinal plane of the power tool and wherein the second spacing is at most 1.5 cm.

* * * * *